United States Patent
Pakkala et al.

(10) Patent No.: US 6,228,154 B1
(45) Date of Patent: May 8, 2001

(54) DISCRETE VENTURI GAS SCRUBBER SYSTEM

(75) Inventors: James L. Pakkala, Livonia; Guang Yu, Northville; David J. Cole, Canton, all of MI (US)

(73) Assignee: Durr Industries, Inc., Plymouth, MI (US)

( * ) Notice: Subject to any disclaimer, the term of this patent is extended or adjusted under 35 U.S.C. 154(b) by 0 days.

(21) Appl. No.: 09/471,562

(22) Filed: Dec. 23, 1999

(51) Int. Cl.[7] .................................................. B01D 47/10
(52) U.S. Cl. .............................. 96/323; 96/328; 96/384; 55/DIG. 46
(58) Field of Search ............................. 96/322, 323, 327, 96/328, 384, FOR 130, FOR 172; 55/DIG. 46

(56) References Cited

U.S. PATENT DOCUMENTS

| | | |
|---|---|---|
| 3,934,495 | 1/1976 | Bloomer . |
| 4,002,441 | 1/1977 | Johnson . |
| 4,220,078 | 9/1980 | Walker et al. . |
| 4,222,319 | 9/1980 | Donahue . |
| 4,285,270 | 8/1981 | Donahue . |
| 4,425,870 | 1/1984 | Marshke . |
| 4,612,025 * | 9/1986 | Sampey ........................... 55/DIG. 46 |
| 4,643,082 | 2/1987 | Lynham et al. . |
| 4,664,060 | 5/1987 | Roberts . |
| 4,700,615 * | 10/1987 | Napadow ........................ 55/DIG. 46 |
| 4,704,952 | 11/1987 | Johnson et al. . |
| 4,721,033 | 1/1988 | Bloomer et al. . |
| 4,726,287 * | 2/1988 | Gerdes et al. ........................ 261/112 |
| 4,848,215 | 7/1989 | Morioka et al. . |
| 4,952,221 | 8/1990 | Morioka . |
| 5,020,470 | 6/1991 | West et al. . |
| 5,100,442 | 3/1992 | Gore et al. . |
| 5,512,017 | 4/1996 | Gore et al. . |
| 5,569,073 | 10/1996 | Cooper . |
| 6,024,796 * | 2/2000 | Salazar et al. ........................ 118/326 |

* cited by examiner

*Primary Examiner*—Duane Smith
*Assistant Examiner*—Robert A. Hopkins
(74) *Attorney, Agent, or Firm*—Howard & Howard

(57) ABSTRACT

A discrete pod gas scrubber system for removing contaminants from the air of a work area, such as a paint spray booth. Each scrubber pod includes an inlet section having opposed converging planar walls and side walls, an intermediate section having opposed diverging walls and side walls communicating with the inlet section through a reduced diameter venturi, and an outlet section having a bottom wall perpendicular to the longitudinal axis of the scrubber pod, a diverging top wall and an end wall. The end wall includes an orifice opening and orifice plates for adjusting the orifice opening and the combined lengths of the aligned scrubber pods are between fifty and ninety percent of the total length of the scrubber system, more preferably between sixty percent and eighty five percent of the total length. The scrubber system of this invention significantly reduces the noise generated in the work area normally located above the gas scrubber system.

9 Claims, 3 Drawing Sheets

DISCRETE VENTURI GAS SCRUBBER SYSTEM

FIELD OF THE INVENTION

The present invention relates to improvements in right angled venturi gas scrubber systems for removing contaminants in the air of a work area, such as a vehicle paint spray booth. The gas scrubber system of this invention reduces the noise level generated by the gas scrubber system in the work area.

BACKGROUND OF THE INVENTION

Gas scrubbers mounted in the floor of a work area are now commonly used to remove air borne contaminants in a work area, such as a vehicle or appliance paint application booth. U.S. Pat. No. 5,100,442 assigned to the assignee of the present application discloses an improved venturi gas scrubber system which is now commonly used to remove paint particles and other contaminants from a paint spray booth. The improved gas scrubber system disclosed in this patent includes an inlet section, which receives water and the contaminated air having planar converging walls which promote uniform flow of the liquid, an intermediate section, which receives the liquid and gas from the inlet section having diverging planar walls, and a lower section including a bottom wall which is generally perpendicular to the diverging walls and an end wall having an orifice opening. The lower section promotes turbulent flow of the liquid which results in transfer of the contaminants to the liquid and the liquid is projected through the orifice preferably at a right angle to the longitudinal axis to the inlet and intermediate sections. This improved gas scrubber system not only efficiently removes the air borne contaminants in the spray booth, but also results in a reduced noise level in the spray booth because sound generated by the nozzle is reflected off of the internal surfaces compared to a "straight-through" scrubber system wherein the liquid and gas are projected downwardly through an orifice opening in the scrubber. The reduced diameter portion between the diverging walls of the inlet section and the converging walls of the intermediate section thus act as a noise barrier reducing the noise in the paint booth as described in the above-referenced patent.

Nevertheless, there is a need to further reduce the sound generated in a work area, such as a paint spray booth, by a venturi gas scrubber system of the type disclosed in the above-referenced patent. Although the automotive industry, for example, is converting to robotic paint application systems, workers still enter the robotic paint spray booth. Further, there are many other applications where the paint is applied by an operator and further applications requiring gas scrubber systems in other industries. A primary object of the gas scrubber system of this invention is to reduce the noise generated in a work area having a gas scrubber system.

The prior art includes numerous examples of gas scrubber systems, many of which are very complex. The prior art also includes gas scrubber systems which comprise a plurality of spaced discrete straight-through venturi-type scrubbers generally having a common inlet. However, the purpose of using spaced discrete scrubbers in the prior art is to reduce manufacturing costs. It is another object of this invention to reduce manufacturing costs and permit easy cleaning of the scrubber pods; however, the primary object of this invention is to reduce the noise projected to the work area.

SUMMARY OF THE INVENTION

The gas scrubber system of this invention comprises a plurality of spaced, generally aligned discrete venturi scrubber pods each having the general configuration of the gas scrubber system described in the above-referenced patent. That is, each scrubber pod includes an inlet section having opposed generally planar converging walls and opposed side walls. The converging walls are angled to promote laminar flow of the liquid through the inlet section, preferably about fifteen degrees relative to vertical, within a range of about two degrees. The gas scrubber pods each further include an intermediate section which communicates with the inlet section having outwardly diverging walls which again promote laminar flow of the water or liquid through the center section and forming a venturi or restricted opening. The included angle between the walls of the inlet section and the outlet section are about one hundred fifty five to one hundred sixty degrees. Finally, the gas scrubber pods each include a lower section having opposed top and bottom walls, wherein the bottom wall is generally perpendicular to the longitudinal axis of the scrubber pod through the inlet and intermediate sections, such that turbulent flow is promoted only in the lower section, wherein the liquid, generally water, mixes thoroughly with the gas and the contaminants are transferred from the gas to the liquid. The intermediate and lower sections also include side walls and the lower section includes an end wall having an outlet port or orifice which projects the liquid and gas outwardly, generally parallel to the bottom wall as shown in the above-referenced patent.

As stated above, a primary object of the gas scrubber system of this invention is to further reduce the noise generated from the scrubbers to the work area. Although the right angled or elbow configuration of the scrubber system disclosed in the above-referenced patent does reduce noise, there is still a need to further reduce the noise reflected to the work area through the scrubbers. This object is accomplished by the use of separate or discrete scrubber pods each having the configuration described above, wherein the combined lengths of the discrete scrubber pods are between fifty and ninety percent of the total length of the scrubber system, which comprises the combined lengths of the scrubber pods plus the length of the spaces between the scrubber pods. More preferably, the combined lengths of the scrubber pods are between sixty and eighty-five percent of the total length of the scrubber system or most preferably about seventy percent plus or minus five percent. The lengths of each scrubber pod measured between the side walls is between two and eight feet, wherein the space between the scrubber pods is preferably between six inches and three feet. More preferably, the length of the scrubber pods is between three and six feet, most preferably about three feet plus or minus six inches. As set forth below, this configuration of aligned discrete scrubber pods results in a significant decrease in the noise reflected upwardly to the work area.

The use of discrete scrubber pods, particularly in combination with a variable outlet orifice, has been experimentally found to significantly reduce the noise transmitted to the work area. It has been found by experimentation that the noise emitted from the scrubber inlet into the work area is generated by the scrubber orifice. With the right angled venturi gas scrubber described in the above-referenced patent, sound waves are required to make several deflections prior to escaping through the inlet section of the scrubber into the work area. That is, there is not a direct path for the sound waves generated at the orifice to escape through the scrubber inlet. It has been found that by increasing the size of the scrubber orifice, the probability is that more of the reflected sound waves will escape through the scrubber orifice rather than the scrubber inlet. That is, a larger outlet orifice results in lower sound levels in the work area.

The effect of reducing the sound reflected to the work area through the scrubber by increasing the size of the orifice is not obvious from the configuration of scrubber. That is, for a fixed scrubber pressure drop, as the scrubber orifice size increases, the air velocity (exhaust volume) through the scrubber increases. Thus, it would be logical to assume that the higher velocity would create higher sound levels in the work area. Further, it would be assumed that the sound would be further increased by reducing the overall length of the scrubber system by dividing the scrubber into separate scrubber pods. Nevertheless, it has been found that the noise generated in the work area may be reduced by dividing the scrubber into spaced discrete scrubber pods, particularly in combination with a variable orifice which may be tuned to balance the system. Thus, in the preferred embodiment of the scrubber system of this invention, the outlet orifice in the end wall of the lower section is adjustable. In the most preferred embodiment, the outlet in the end wall is an elongated opening spaced above the bottom wall, most preferably rectangular for ease of construction. The orifice opening is adjustable to increase or decrease the area of the opening, thereby increasing or decreasing the pressure drop across the opening and adjusting the volume of air transferred through the opening. In the disclosed embodiment, the opening through the end wall is adjusted by a member, preferably a plate, adjustably secured to the end wall partially blocking the elongated opening and adjustable on the end wall to adjust the area of the opening. In the most preferred embodiment, the opening may be adjusted to a width of between about three to five inches, wherein the fixed opening is about six inches. The scrubber pods may also be easily cleaned by adjusting or removing the plate providing ready access to the lower section of the scrubber pods.

The gas scrubber system of this invention having spaced generally aligned discrete scrubber pods significantly reduces the noise generated through the scrubber system to the work area. Further, the outlet orifice of each scrubber pod may be adjusted to tune and balance the system. The gas scrubber system of this invention is also very efficient in removing contaminants from the gas or air in the work area and the scrubber system is relatively simple in construction, low cost and easily adaptable to large systems. Other advantages and meritorious features of the gas scrubber system of this invention will be more fully understood from the following description of the preferred embodiments, the appended claims and the drawings, a brief description of which follows.

DESCRIPTION OF THE PREFERRED EMBODIMENTS

Figure 1:
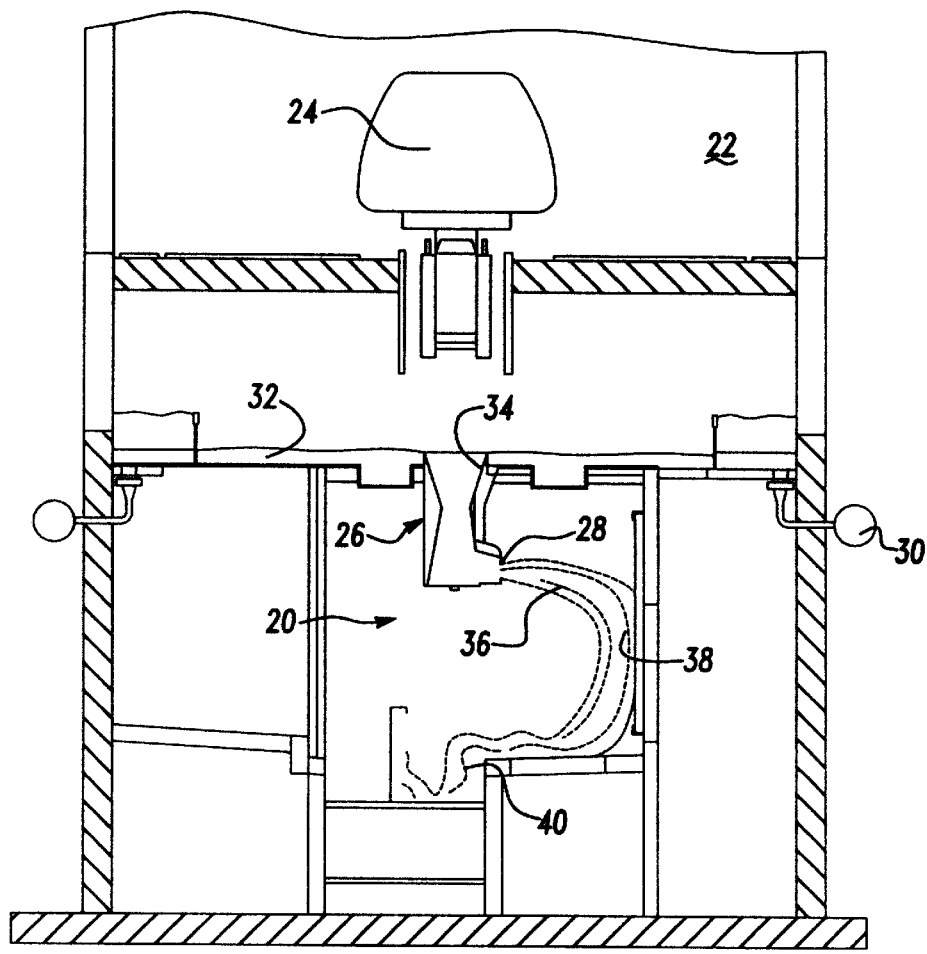
FIG. 1 is a schematic side cross sectional view of a typical vehicle paint application booth through one scrubber pod.

FIG. 1 illustrates one environment of the gas scrubber system 20 of this invention in association with a conventional paint spray booth 22 used to paint vehicles 24. As discussed above, the gas scrubber system 20 of this invention may be utilized to clean the air in a paint spray booth 22, for example, or any environment which requires cleaning of gas using a liquid. Further, the gas scrubber system 20 of this invention may be utilized in a paint spray booth where paint is applied to any article including appliances, for example. In a conventional paint spray booth, gas scrubber 26 receives air from the spray booth 22 and the air is drawn by fan, not shown, through the scrubber 26. As described more fully below, the air is then discharged through the outlet 28 of the gas scrubber. The water, which generally includes a detackifier such as metal salts and/or polymers, is pumped by pumps 30, creating a stream 32, which is received in the inlet 34 of the gas scrubber pods 26. As described below, the mixture of water and gas is then propelled by the venturi scrubber pods 26 from outlet 28 as shown at 36. The jet of intermixed air and water is then directed outwardly, generally perpendicular to the longitudinal axis of the inlet or parallel to the floor, which impinges the wall 38, which removes the majority of the water and the entrained contaminant particles from the air. The separated water then leaves the scrubber system 20 through outlet 40. The air is then drawn by a fan through a baffle system (not shown) which further removes the water and the entrained contaminants, and the air is then generally vented to atmosphere.

As described above and in the above-referenced U.S. patent, a venturi-type gas scrubber wherein the water and gas is mixed in a lower section and the mixture is projected generally perpendicular to the longitudinal axis of the scrubber has several advantages over the prior art, including improved efficiency and reduced noise compared to straight-through scrubbers, wherein the outlet is in line with the longitudinal axis of the scrubber. Therefore, the preferred embodiments of the gas scrubber system of this invention is a venturi-type right angled gas scrubber which takes advantages of these improvements. However, it has been found desirable to further reduce the noise generated by the scrubber disclosed in the above-referenced U.S. patent in the work area 22 which is accomplished by the improvements disclosed herein.

Figure 2:
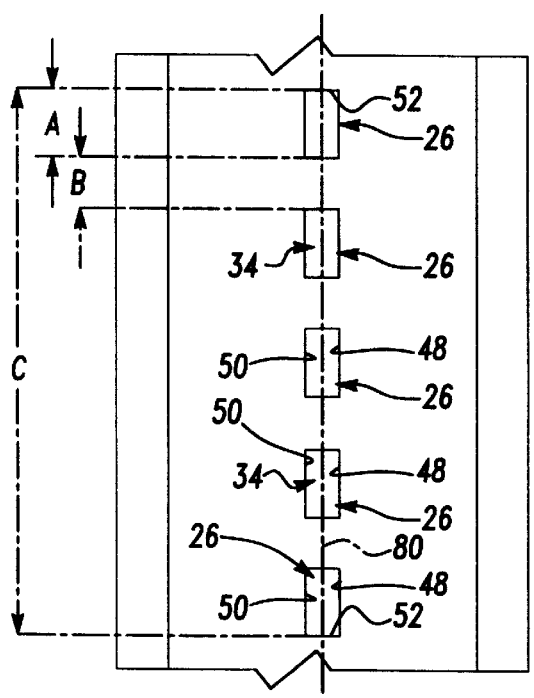
FIG. 2 is a top view illustrating the spacing between the scrubber pods.
Figure 3:
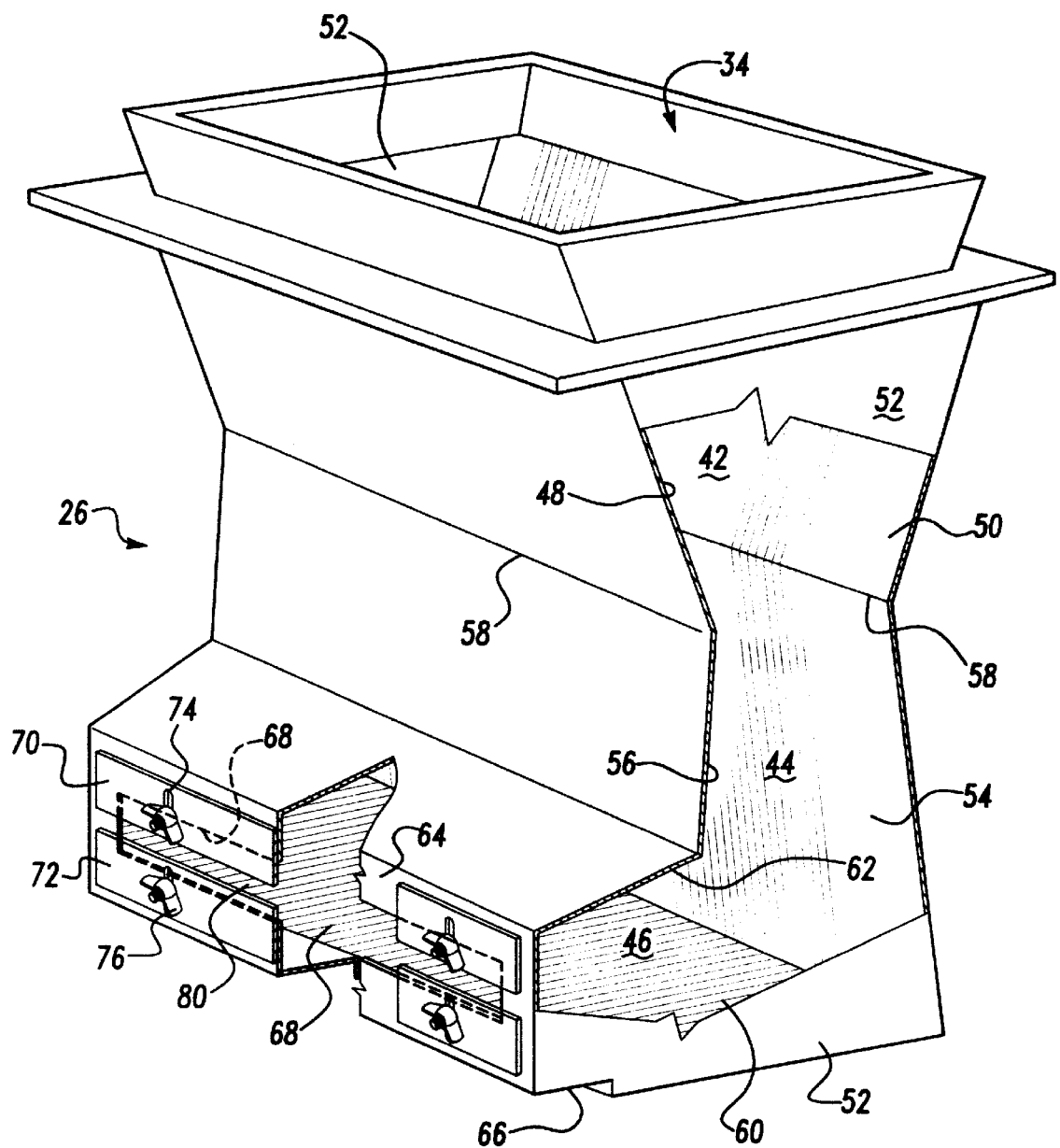
FIG. 3 is a side partially crossed section perspective view of a scrubber pod of this invention.

FIG. 2 illustrates a preferred arrangement of the separate discrete aligned scrubber pods 26, which will be discussed more fully below, and FIG. 3 illustrates a preferred embodiment of one of the identical scrubber pods 26. Each scrubber pod 26 includes an inlet section 42, an intermediate section 44 and a lower section 46. The inlet section 42 is defined by opposed downwardly converging walls 48 and 50 and side walls 52. The intermediate section 44, which communicates with the inlet section 42, is defined by opposed downwardly diverging walls 54 and 56 and side walls 52. The lower section 46 is defined by bottom wall 60, the opposed top wall 62 and the end wall 64, which is preferably spaced above the bottom wall 60 by wall 66, having an outlet opening or orifice 68. The junction 58 of the converging walls 48 and 50 of the inlet section 42 and the diverging walls 54 and 56 of the intermediate section 44 thus defines a pinch point or venturi for the baffle pod. As described above, the angles of the converging walls 48 and 50 and the diverging walls 54 and 56 are selected to promote uniform flow of the water received in inlet 34. The generally perpendicular bottom wall 60 and the opposed sharply diverging top wall 62 promote turbulent flow of the water or other liquid received in the scrubber pod 26, intermixing the water and the air or other gas and transferring the contaminants in the air to the water. The intermixing of the water and air is further facilitated by the location of the elongated outlet opening 68 spaced above the bottom wall 60. As described above, the converging walls 48 and 50 of the inlet section 42 preferably define an angle relative to vertical of about fifteen degrees, within a range of about two degrees. The included angle between the converging walls 48 and 50 of the inlet section 42 and the diverging walls 54 and 56 of the intermediate section is preferably about one hundred fifty five to one hundred sixty degrees. This angular configuration promotes laminar flow of the water through the inlet and intermediate sections, such that substantially all of the turbulent flow is in the lower section 46. This results in improved efficiency and reduced noise generated to the work area through the scrubber.

In the preferred embodiment of the scrubber pods 26, the end wall 64 has an adjustable opening. Adjustment of the opening 68 in the end wall 64 is accomplished by end plates 70 and 72 each having vertical slots 74 and the plates are held in their adjusted position by wing nuts 76. The size of the orifice opening 80 between the plates 70 and 72 may thus be easily adjusted by loosening the wing nuts 76, adjusting the plates 70 and 72 upwardly or downwardly, and retightening the wing nuts 76. In the most preferred embodiment, the fixed rectangular opening 68 in the end wall 64 has a width of about six inches and the width of the opening 80 between the end plates 70 and 72 are adjustable to between about four and five inches. As discussed below, the adjustability of the orifice opening 80 in combination with spaced generally aligned discrete scrubber pods 26 results in a significant and surprising reduction in the noise generated by the scrubber pods 26 in the work area.

Referring back to FIG. 2 which illustrates a preferred arrangement of the scrubber pods 26, wherein the converging side walls 48 and 50 are aligned on axis 80. The preferred length of the scrubber pods measured between the side walls 52 as shown by dimension "A" is between two and eight feet, more preferably between three feet and five feet or most preferably about three feet within a range of six inches. More importantly, the combined lengths "A" of the scrubber pods 26 is between fifty percent and ninety percent of the overall length "C" of the scrubber system which comprises the combined lengths "A" of the scrubber pods plus the spaces "B" between the scrubber pods. In the more preferred embodiment of the scrubber system of this invention, the combined lengths "A" of the scrubber pods is between sixty percent and eighty five percent of the overall length "C" of the scrubber system and most preferably about seventy percent, within five percent. This relationship results in the spacing "B" between the scrubber pods of between six inches and three feet.

Figure 4:
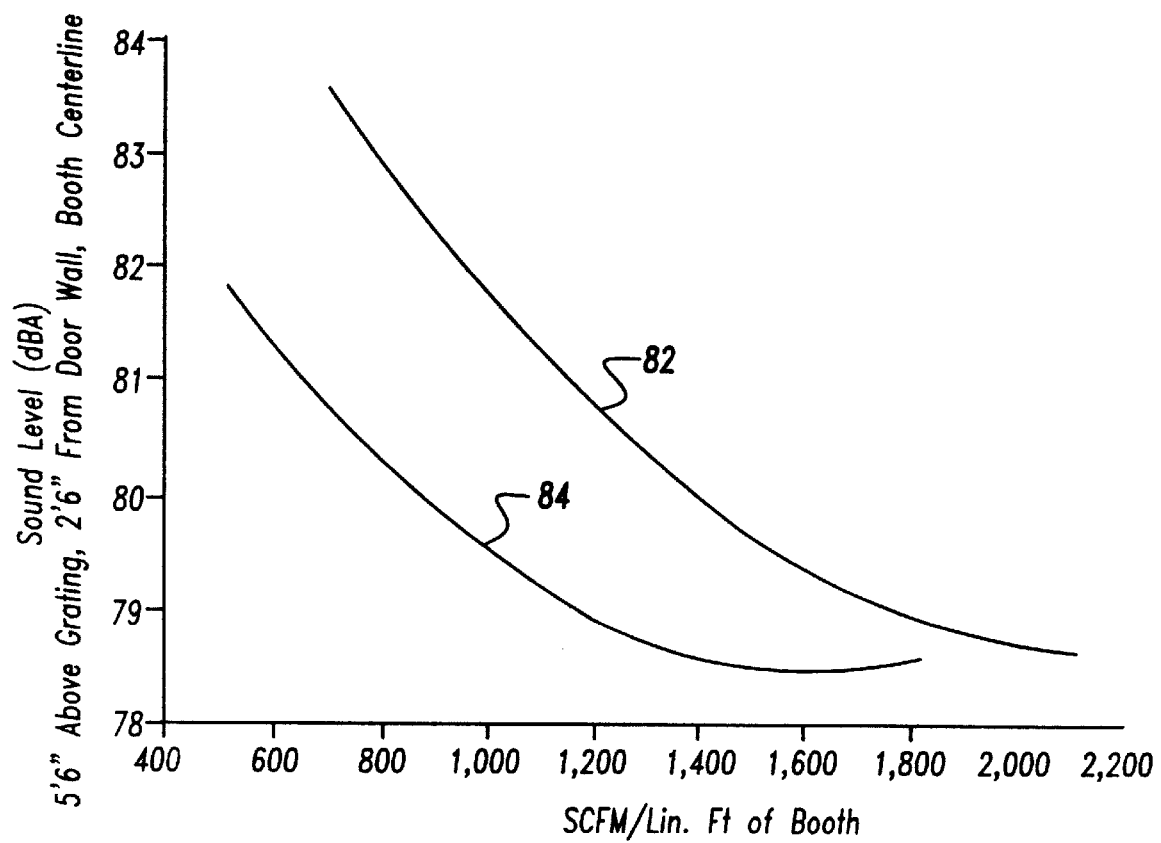
FIG. 4 is a graphical illustration of the sound reduction resulting from the improved gas scrubber system of this invention.

FIG. 4 graphically illustrates the improvement provided by the gas scrubber system of this invention having spaced aligned discrete scrubber pods 26 as shown in FIG. 2. FIG. 4 plots standard cubic feet per minute (SCFM) per linear foot of spray booth on the X axis versus sound level measured five feet six inches above grating and two foot six inches from the booth side wall. Line 82 is a plot of the sound level for a continuous scrubber system as disclosed in the above-referenced U.S. patent and line 84 is a plot of a discrete scrubber system of this invention, wherein the combined lengths of the individual scrubber pods ("A" in FIG. 3) was sixty percent of the total length of the scrubber system ("C" in FIG. 2). As can be seen from the plots of FIG. 4, the sound level of the discrete scrubber system 84 is significantly less than the continuous scrubber system 82. It should be noted in this regard that automated (e.g. robotic) paint application system generally used by the automotive companies, for example, has eight hundred to nine hundred fifty standard cubic feet per minute air flow per linear foot of booth, wherein the improvement is about three decibels, bringing the sound level within the booth to acceptable levels.

As set forth above, the applicant has discovered that a larger outlet orifice for a scrubber system of the type shown in the above referenced patent results in reduced noise in the work area. This conclusion is not obvious when one considers that for a fixed scrubber pressure drop, as the orifice increases, the air velocity through the scrubber also increases. It would thus be logical to assume that a greater velocity would create greater sound levels in the work area. However, as shown by FIG. 4, this is not the case. It is now believed, however, that by increasing the size of the scrubber orifice, there is a greater probability of more of the reflected sound waves escaping through the scrubber orifice, rather than the scrubber inlet. This results in lower sound levels in the work area. More importantly, it is possible to increase the scrubber orifice of the individual scrubber pods more than in a continuous scrubber of the type shown by the above-referenced patent. Further, it has been found that an adjustable orifice is particularly advantageous in combination with separate discrete scrubber pods. Thus, in the preferred embodiment of the gas scrubber system of this invention, the discrete scrubber pods have adjustable orifices as described above. It is then possible to adjust the orifice of each pod to increase or decrease the area of the opening, thereby increasing or decreasing the pressure drop across the opening for each pod and adjusting the volume of air transferred through each opening. It is also possible to adjust or remove the plates 70 and 72 to provide better access to the interior of the scrubber pod. In a most preferred embodiment, the adjustable plates 70 and 72 partially block the opening 68 and the orifice is adjustable to provide an opening having a width of four to five inches.

Having described the preferred embodiments of the gas scrubber system of this invention, it will be understood by those skilled in the art that various modifications may be made within the purview of the appended claims. Having described the preferred embodiments, the invention is now claimed as follows:

What is claimed is:

1. A gas scrubber system, comprising:

a work area containing air to be cleaned of contaminants having a floor receiving a liquid;

a gas scrubber comprising a plurality of spaced, generally aligned discrete scrubber pods, each scrubber pod including an inlet section having opposed converging generally planar walls and opposed side walls, said inlet section receiving said gas and said liquid in generally uniform flow along said walls, an intermediate section communicating with said inlet section having opposed diverging walls and side walls receiving liquid and gas from said inlet section, and a lower section communicating with said intermediate section having opposed top and bottom walls wherein said bottom wall extends generally transverse to said opposed diverging walls of said intermediate section promoting turbulent flow of said liquid and transfer of said contaminates to said liquid, side walls and an end wall having an orifice nozzle directing a mixture of said liquid and gas generally perpendicular to an axis of said inlet section defined between said diverging walls; and said spaced discrete scrubber pods being aligned such that said converging walls of said inlet sections are aligned and the combined lengths of said discrete scrubber pods in between fifty and ninety percent of the total length of said scrubber system consisting of said combined lengths plus the length of the spaces between said scrubber pods.

2. The gas scrubber system defined in claim 1, wherein said orifice nozzle has an adjustable opening to increase or decrease the area of said opening, thereby increasing or decreasing the pressure drop across said opening and adjust the volume of air transferred through said opening.

3. The gas scrubber system defined in claim 1, wherein said orifice nozzle comprises an elongated opening through said end wall and said end wall including a member adjustably secured to said end wall partially blocking said elongated opening and adjustable on said end wall to adjust the area of said opening, thereby adjusting the pressure drop across said opening.

4. The gas scrubber system defined in claim 3, wherein said member is a plate adjustably secured to said end wall partially obstructing said opening to adjust the width of said opening to between three and six inches.

5. The gas scrubber system defined in claim 1, wherein said combined lengths of said scrubber pods are between sixty and eight-five percent of said total length of said scrubber system.

6. A gas scrubber system, comprising:
a work area containing air to be cleaned of contaminates having a floor receiving a liquid;
a gas scrubber comprising a plurality of spaced discrete generally aligned scrubber pods; each scrubber pod including a downwardly opening inlet section having opposed converging generally planar walls and side walls receiving said gas and said liquid in generally uniform flow along said walls, and intermediate section communicating with said inlet section having opposed diverging walls and side walls receiving liquid and gas from said inlet section and a lower section having opposed top and bottom walls extending generally transverse to said opposed diverging walls of said intermediate section promoting turbulent flow of said liquid and transfer of said contaminates to said liquid, side walls and an end wall having an opening therethrough directing a mixture of said liquid and gas generally perpendicular to an axis defined between said walls of said intermediate section and a member adjustably secured to said end wall partially blocking said opening for adjusting the area of said opening and thereby the pressure drop of said liquid and gas mixture across said opening; and
said spaced discrete scrubber pods being aligned such that said converging walls of said inlet sections are aligned and the combined lengths of said discrete scrubber pods are between fifty and ninety percent of the total length of said scrubber system consisting of said combined lengths plus lengths of the spaces between said scrubber pods.

7. The gas scrubber system defined in claim 6, wherein said combined length of said scrubber pods is between sixty and eight-five percent of the total length of said scrubber system and the spaces between said scrubber pods is between six inches and three feet.

8. The gas scrubber system defined in claim 7, wherein the length of said scrubber pods measured between said side walls is between two and eight feet.

9. The gas scrubber system defined in claim 6, wherein said outlet opening in said end wall is an elongated rectangular opening and said member is a plate adjustably secured to said end wall partially obstructing said opening such that the adjustable width of said opening is between three and six inches.

\* \* \* \* \*